UNITED STATES PATENT OFFICE.

CARL LUDWIG MÜLLER, OF LUDWIGSHAFEN, GERMANY, ASSIGNOR TO THE BADISCHE ANILIN AND SODA FABRIK, OF SAME PLACE.

ORANGE DISAZO DYE.

SPECIFICATION forming part of Letters Patent No. 524,261, dated August 7, 1894.

Application filed February 1, 1894. Serial No. 498,695. (Specimens.)

*To all whom it may concern:*

Be it known that I, CARL LUDWIG MÜLLER, doctor of philosophy, a subject of the King of Bavaria, residing at Ludwigshafen-on-the-Rhine, in the Kingdom of Bavaria and Empire of Germany, have invented new and useful Improvements in the Manufacture of a New Orange Disazo Dye, of which the following is a specification.

My invention relates to the manufacture of a new substantive dye which yields orange shades on cotton and which is chemically a disazo-dye that can be derived from a meta-phenylene-diamin-disulfoacid and from the diazo-compounds of primulin and of anilin sulfoacid. The said disulfoacid is obtained by treating meta-phenylene-diamin or salts thereof with fuming sulfuric acid and sufficient acid must be taken that at least two molecular proportions of free or available sulfuric anhydride ($SO_3$) are present for one molecular proportion of meta-phenylene-diamin. If this condition be satisfied the strength of acid and temperature of treatment may be varied within certain limits, though the ease with which the reaction can be effected increases as the excess of fuming acid present or the strength thereof is increased. Thus when using an acid containing about ten per cent. free anhydride a temperature of about 120° centigrade was found necessary to effect the reaction while with an acid containing about seventy per cent. ($SO_3$) a temperature of about 70° was sufficient.

The following test will serve as a guide when preparing the disulfoacid:—Take a test-portion of the sulfonation melt and combine it, in alkaline solution with diazo-primulin. The dye obtained will fix itself on cotton giving orange-yellow shades if the production of the desired disulfoacid is complete, the presence of unchanged meta-phenylene-diamin or of the monosulfoacid thereof causes the color to be of a browner shade.

The following examples will serve to further illustrate the nature of the invention and the manner in which it can be best carried into practical effect. The parts are by weight.

1. *Production of the meta-phenylene-diamin-disulfoacid.*—Mix one (1) part of meta-phenylene-diamin-hydrochlorate with about five (5) parts of fuming sulfuric acid containing about forty per cent. (40%) free anhydride, keep cool while mixing and subsequently heat the mixture at first for a few hours at about one hundred (100) degrees centigrade and subsequently raise the heat to about one hundred and twenty (120) degrees and maintain it for about six to ten (6 to 10) hours or until the test above described indicates the end of the reaction. Pour the mixture into ice-water, neutralize with milk of lime filter from the sulfate of lime and convert into sodium salt in the usual way. The solution of sodium salt so obtained may be used directly in the manufacture of dyes. The free acid may also be isolated. For this purpose concentrate the solution of the calcium or sodium salt by evaporation and add an excess of strong hydrochloric acid to the concentrated solution, filter and dry the precipitate of disulfoacid which separates out. When pure this is a white crystalline powder readily soluble in hot water less soluble in cold water.

2. *Production of the new disazo-dye from meta-phenylene-diamin-disulfoacid and the diazo-compounds of primulin and anilin sulfoacid.*—Diazotize about fifty-six (56) parts of primulin in about five hundred (500) parts of water by treatment with about seven (7) parts of sodium nitrite and about forty-nine (49) parts of hydrochloric acid (containing about thirty per cent (30%) real acid $HC_1$). Pour the resulting diazo-compound into an ice-cold solution of about twenty-seven (27) parts of meta-phenylene-diamin-disulfoacid and twenty-eight (28) parts of calcined soda in about four hundred (400) parts of water. Allow to stand for about twenty-four (24) hours and then treat the solution with about thirty (30) parts of crystallized sodium acetate and then with the diazo-compound from about twenty parts of sodium sulfanilate or metanilate (20 parts $C_6H_4NH_2SO_3Na$) obtained in the usual way by treatment with about seven (7) parts of sodium nitrite about two hundred (200) parts of water and about thirty-nine (39) parts of hydrochloric acid (containing about thirty per cent. (30%) real acid $HC_1$). Stir the mixture for about five to eight (5 to 8) days, heat the solution acidify with hydrochloric acid and precipitate the dye with common salt.

Filter and to the residue add sufficient soda to form the soluble sodium salt, dry the mixture and grind to a powder.

The dye obtained whether using metanilic acid or sulfanilic acid is practically identical. It occurs as a brown powder giving an orange-colored solution in water, on boiling it dyes cotton goods an orange color. On adding hydrochloric acid to the aqueous solution a red precipitate is obtained while sodium nitrite and hydrochloric acid yields a dirty brown precipitate. The solution in concentrated sulfuric acid is of a brilliant red color. The dye is practically insoluble in alcohol, ether and benzene.

Now, what I claim is—

The new disazo-dye hereinbefore described which can be derived from meta-phenylene-diamin-disulfoacid and the diazo-compounds from primulin and anilin sulfoacid and which occurs as a brown powder soluble in water giving an orange colored solution from which nitrate of soda and hydrochloric acid throws down a dirty brown precipitate and which dye gives a brilliant red solution in concentrated sulfuric acid all substantially as described.

In testimony whereof I have hereunto set my hand in the presence of two subscribing witnesses.

CARL LUDWIG MÜLLER.

Witnesses:
ERNEST F. EHRHARDT,
ADOLPH REUTLINGER.